P. I. ANDREWS.
ANTIFRICTION ATTACHMENT FOR GREENHOUSE BENCHES.
APPLICATION FILED JAN. 6, 1921.
1,419,484.
Patented June 13, 1922.
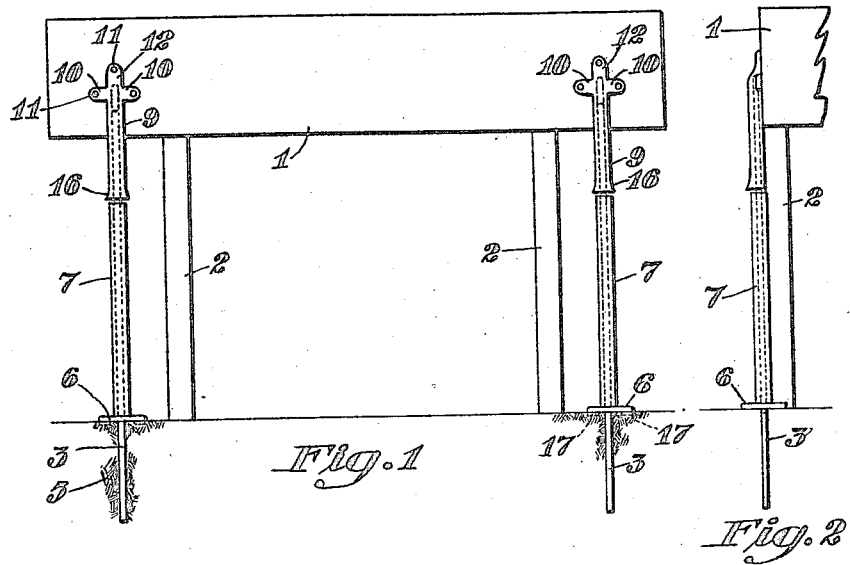
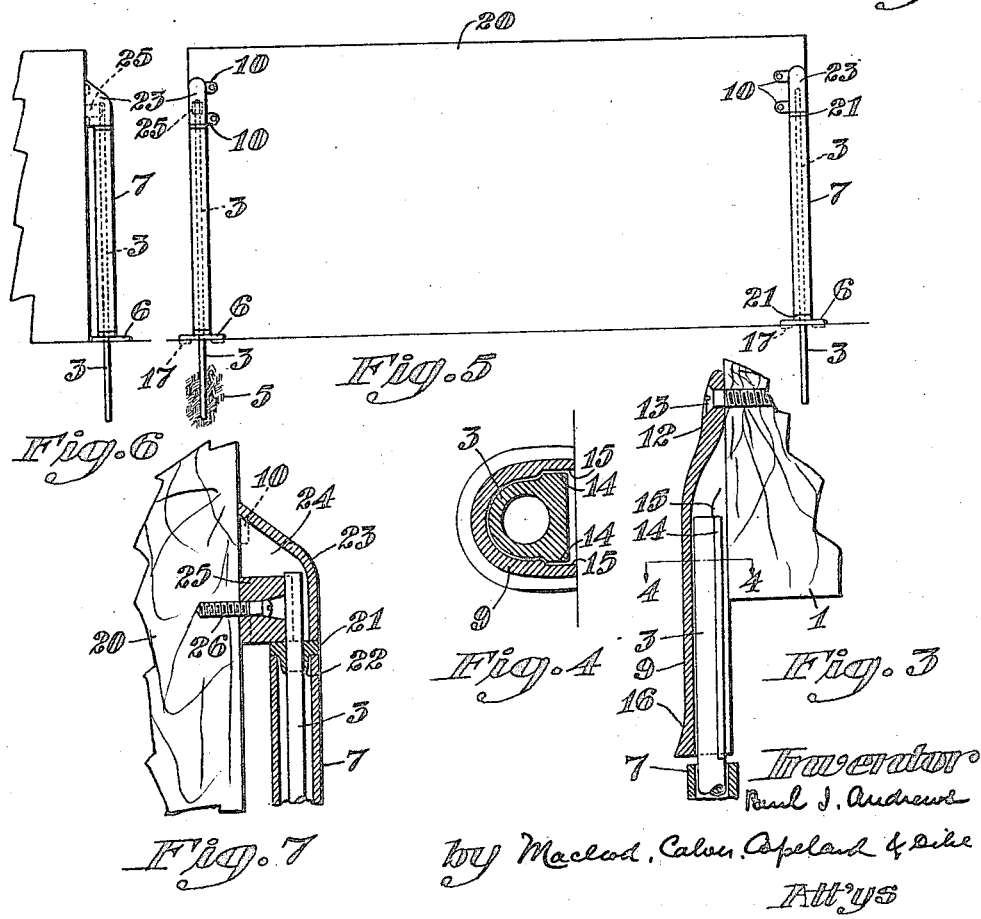
Inventor
Paul I. Andrews
by Macleod, Calver, Copeland & Dike
Att'ys

UNITED STATES PATENT OFFICE.

PAUL I. ANDREWS, OF KENNEBUNK, MAINE.

ANTIFRICTION ATTACHMENT FOR GREENHOUSE BENCHES.

1,419,484.	Specification of Letters Patent.	Patented June 13, 1922.

Application filed January 6, 1921. Serial No. 435,482.

*To all whom it may concern:*

Be it known that I, PAUL I. ANDREWS, a citizen of the United States, residing at Kennebunk, county of York, State of Maine, have invented a certain new and useful Improvement in Antifriction Attachments for Greenhouse Benches, of which the following is a specification, reference being had therein to the accompanying drawings.

The object of my invention is to provide an attachment for the ends of greenhouse benches to prevent wear on the hose, wear on the legs of the benches and the kinking of the hose and consequent loss and waste of water by reason of the kinking. In the ordinary greenhouse practice the hose is dragged around the ends of the benches and soon begins to wear a groove in the bench or in the legs of the bench by reason of the friction, thus also increasing the difficulty of dragging the hose. If a kink comes in the hose the operator usually lays it down in the aisle without shutting off the water or closing the nozzle and goes back to straighten it out, and then returns to continue watering. In the meantime, the water is going to waste and flooding the aisle. One feature of my invention consists in providing an anti-friction attachment for the ends of the benches to prevent the wear and forming of the kinks already referred to. Other features of the invention relate to the construction and method of attachment of the device.

The invention will be fully understood from the following description when taken in connection with the accompanying drawings, and the novel features thereof will be pointed out and clearly defined in the claims at the close of this specification.

In the drawings, Fig. 1 is a view in elevation of a bench equipped with devices embodying the invention, the bench being shown as mounted on legs.

Fig. 2 is a side elevation viewed from the right-hand side of Fig. 1.

Fig. 3 is a vertical sectional view partly broken away, showing the upper part of the device on a somewhat larger scale than in Fig. 2.

Fig. 4 is a sectional view on an enlarged scale, on line 4—4 of Fig. 3.

Fig. 5 is a view in elevation of a modified form of the device for use in connection with a bench which is made solid to the ground or filled with soil from the top to the ground.

Fig. 6 is a side elevation viewed from the left-hand side of Fig. 5.

Fig. 7 is a vertical sectional view showing the upper portion of the device on a somewhat larger scale than in Fig. 6.

Referring now to the drawings, 1 represents the end of the bench mounted on the legs 2—2. It is shown as provided with two of the anti-friction devices, one near each side and both outside of the legs 2, 2 so as to protect the hose against coming in contact with the legs. Each of these devices has a rod 3 which may be either solid or a piece of pipe. In practice I prefer to use a quarter inch pipe. This rod is long enough to be driven into the ground 5 several inches, as shown in Figure 1, and is provided with a washer 6 which is slipped over the rod and which rests on the surface of the ground, as shown in the drawings. Preferably the washer 6 is provided with spurs 17 on its under side to prevent its turning. There is slipped over the rod 3 a tube 7 which fits sufficiently loose upon the rod to form a roller. Preferably I use for this purpose a three-quarter inch tube. The upper end of the rod extends up somewhat above the lower edge of the bench and is clamped to the bench by a clamp 9. Preferably this clamp is of semi-cylindrical form throughout the greater part of its length and of substantially the same diameter as the tubular roller 7. The clamp is placed over the rod so that its rounded side is outward, its open face being toward the bench and it extends down nearly far enough to meet the upper end of the tubular roller 7. Preferably there is a little play between the upper end of the roller and the lower end of the clamp, as shown in the drawings. Preferably the upper end of the rod 3 has a flattened portion 14 on one side to engage a flat part 15 of the groove in the clamp to prevent the rod from turning.

The upper end of the clamp is provided with means for securing it to the wall 1 of the bench. As shown it has oppositely extending ears 10—10 provided with screw holes 11 by which it may be screwed to the bench, and also has an upwardly extending portion 12 provided with a screw hole 11 having a screw 13 for screwing into the bench. The clamp holds the upper end of the rod firmly and this together with the projection of the rod into the ground holds the rod in position. It will be seen that the roller 7 which is loose on the rod, serves as an anti-friction roller for the hose as it is dragged around and comes in contact with the roller. By the use of two devices near the opposite edges of the bench the hose is prevented from at any time coming in contact with the legs 2—2.

The opposite end of the bench will be provided with similar devices and also the sides of the bench may be provided with similar devices if the bench has any intermediate legs against which protection is required.

The lower end of the roller should preferably rest upon the top of the washer 6, so that there will be no exposed corner or edge at the lower end of the roller.

Preferably there is a very little space between the lower end of the clamp 9 and the upper end of the roller 7, so that the roller will run free without friction against the lower end of the clamp, but the space must be very slight, otherwise the roller will ride up on the hose.

Preferably also the clamp is made slightly flaring at its lower end, as shown at 16.

In the modification shown in Figures 5, 6 and 7, the bench 20 rests directly on the surface of the ground without legs. For use with this form of bench the rod 3 is similar to that already described, and is provided with a washer 6 which rests on the surface of the ground. In this form of the device the roller 7 is preferably provided with a metal collar 21 at each end which fits onto the rod and has a nipple portion 22 which extends loosely into the end of the roller. This makes the roller run more easily. The clamp 23 is made with a somewhat deeper vertical groove 24 than the clamp 9 previously described, and a block 25 is provided which is screwed to the bench 20 by a screw 26 and projects out into the groove 24 to engage the side of the rod 3, and thereby serve to bolster out the rod free from the end of the bench, as shown in Figure 7.

In this construction the clamps 23 instead of having the ears extend laterally on both sides of the clamp, are provided with two ears 10 both projecting from the same side of the clamp, as shown in Figure 5, so as to enable the device to be attached directly at the edge of the bench. In this case the clamps are preferably made as rights and lefts.

What I claim is:—

1. An anti-friction hose protector attachment for greenhouse benches, comprising a rod which extends into the ground in proximity to the bench, and which extends up alongside one wall of the bench, a tubular roller mounted loosely on said rod, the rod extending somewhat above the top of the roller, a clamp having a grooved shank portion which lies over the outer face of the rod above the upper end of the said roller, and means for securing the clamp to the bench.

2. An anti-friction hose protector attachment for greenhouse benches, comprising a rod which extends into the ground in proximity to the bench, and extends up alongside one wall of the bench, a tubular roller mounted loosely on said rod, a clamp having a grooved shank portion which lies over the outer face of the rod above the upper end of the said roller, means for securing the clamp to the bench, and a washer below the lower end of the roller through which the said rod passes and which rests upon the surface of the ground and is formed with projections on its under face which engage with the ground to prevent sliding of the washer on the surface of the ground.

3. An anti-friction hose protector attachment for greenhouse benches, comprising a rod which extends into the ground in proximity to the bench, and extends up alongside one wall of the bench, a tubular roller mounted loosely on said rod, a clamp having a grooved shank portion which lies over the outer face of the rod above the upper end of the said roller, means for securing the clamp to the bench, a washer below the lower end of the roller through which the said rod passes and which rests upon the surface of the ground, said washer being provided with projections on its under side to engage the surface of the ground to prevent rotation of the washer.

4. An anti-friction hose protector attachment for greenhouse benches, comprising a rod which extends into the ground in proximity to the bench, and which extends up alongside one wall of the bench, a tubular roller mounted loosely on said rod, the rod extending somewhat above the top of the roller, a collar on each end of the roller having a nipple which extends into the end of the tubular roller, said collars forming guides for the rod, a clamp having a grooved shank portion which lies over the outer face of the rod above the upper end of said roller, and means for securing the clamp to the bench.

5. An anti-friction hose protector attachment for greenhouse benches, comprising a rod which extends into the ground in proximity to the bench, and which extends up alongside one wall of the bench, a tubular roller mounted loosely on said rod, the rod extending somewhat above the top of the roller, a clamp having a grooved shank portion which lies over the outer face of the rod above the upper end of the said roller, said rod being formed with a flattened portion near its upper end, and the groove of the clamp being formed with a flat-faced portion which engages with the flattened portion of the rod to prevent rotation of the rod, and means for securing the clamp to the bench.

6. An anti-friction hose protector attachment for greenhouse benches, comprising a rod which extends into the ground in proximity to the bench, and which extends up alongside one wall of the bench, a tubular roller mounted loosely on said rod, the rod extending somewhat above the top of the roller, a block secured to the bench above the upper end of the roller, and engaging the upwardly extending portion of the rod, and means for securing the clamp to the bench.

7. An anti-friction hose protector attachment to greenhouse benches comprising a rod which extends into the ground adjacent the bench, and a member rotatably mounted on the rod in position to guard the hose from engagement with the bench.

8. An anti-friction hose protector attachment for greenhouse benches, comprising a rod which extends into the ground in proximity to the bench, an anti-friction roller mounted on the rod, and a washer below the roller through which the rod passes and which rests upon the surface of the ground and is formed with projections which engage with the ground to prevent displacement of the washer.

9. An anti-friction hose protector attachment for greenhouse benches, comprising a rod which extends into the ground in proximity to the bench, an anti-friction roller mounted on the rod, means for attaching the rod to the bench, and a washer below the roller through which the rod passes and which rests upon the surface of the ground and is formed with projections which engage with the ground to prevent displacement of the washer.

10. An anti-friction hose protector comprising a standard whose lower end is stuck into the ground, an anti-friction tubular roller mounted on said standard, and a member connected with said standard which supports the lower end of said roller and rests upon the surface of the ground when the lower end of the standard is inserted in the ground.

11. An anti-friction hose protector comprising a standard whose lower end is stuck into the ground, an anti-friction roller mounted on said standard, a member connected with said standard which rests upon the surface of the ground when the lower end of the standard is inserted in the ground, and projections on said member which engages with the ground.

In testimony whereof I affix my signature.

PAUL I. ANDREWS.